United States Patent
Chang et al.

(10) Patent No.: US 8,019,865 B2
(45) Date of Patent: Sep. 13, 2011

(54) METHOD AND APPARATUS FOR VISUALIZING NETWORK SECURITY STATE

(75) Inventors: Beom Hwan Chang, Daejeon (KR); Chi Yoon Jeong, Daejeon (KR); Seon Gyoung Sohn, Daejeon (KR); Soo Hyung Lee, Daejeon (KR); Hyo Chan Bang, Daejeon (KR); Geon Lyang Kim, Daejeon (KR); Hyun Joo Kim, Seoul (KR); Won Joo Park, Daejeon (KR); Jong Ho Ryu, Choongcheongnam-do (KR); Jong Hyun Kim, Daejeon (KR); Jung Chan Na, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 184 days.

(21) Appl. No.: 12/517,091

(22) PCT Filed: Oct. 24, 2007

(86) PCT No.: PCT/KR2007/005258
§ 371 (c)(1),
(2), (4) Date: Jun. 1, 2009

(87) PCT Pub. No.: WO2008/069442
PCT Pub. Date: Jun. 12, 2008

(65) Prior Publication Data
US 2010/0100619 A1    Apr. 22, 2010

(30) Foreign Application Priority Data
Dec. 4, 2006 (KR) .................. 10-2006-0121829

(51) Int. Cl.
*G06F 15/173* (2006.01)

(52) U.S. Cl. ...................................... 709/224
(58) Field of Classification Search ........... 709/223–224
See application file for complete search history.

(56) References Cited

U.S. PATENT DOCUMENTS

| 5,309,564 | A | 5/1994 | Bradley et al. |
| 5,568,471 | A | 10/1996 | Hershey et al. |
| 6,282,546 | B1 * | 8/2001 | Gleichauf et al. ............. 726/25 |

(Continued)

FOREIGN PATENT DOCUMENTS

| KR | 1020010018998 A | 3/2001 |
| KR | 1020030003981 A | 1/2003 |
| KR | 1020040036228 A | 4/2004 |

(Continued)

OTHER PUBLICATIONS

Koike and Ohno. SnortView: Visualization System of Snort Logs. VizSEC/DMSEC '04 Proceedings of the 2004 ACM Workshop on Visualization and data mining for computer security. Oct. 29, 2004. pp. 143-147.*

(Continued)

*Primary Examiner* — Douglas Blair
*Assistant Examiner* — John MacIlwinen
(74) *Attorney, Agent, or Firm* — Ladas & Parry LLP

(57) ABSTRACT

There are provided a network security state visualization device and method, the device including: a security event collector collecting original security event information from network security apparatuses; a security event analyzer analyzing the original security event information collected by the security event collector and extracting characteristic data corresponding to a security event; and a three-dimensional visualization display unit visualizing a correlation between the characteristic data extracted by the security event analyzer as a three-dimensional screen to be displayed.

19 Claims, 6 Drawing Sheets

U.S. PATENT DOCUMENTS

| | | |
|---|---|---|
| 6,400,766 B1 | 6/2002 | Lafe |
| 2002/0066034 A1 | 5/2002 | Schlossberg et al. |
| 2006/0098579 A1 | 5/2006 | Chang et al. |
| 2006/0140127 A1 | 6/2006 | Lee et al. |

FOREIGN PATENT DOCUMENTS

| | | |
|---|---|---|
| KR | 1020040041980 A | 5/2004 |
| KR | 1020040072365 A | 8/2004 |
| KR | 1020060013120 A | 2/2006 |
| KR | 1020060042788 A | 5/2006 |
| KR | 1020060046812 A | 5/2006 |
| KR | 1020060076337 A | 7/2006 |

OTHER PUBLICATIONS

Koike, Ohno and Koizumi. Visualizing Cyber Attacks using IP Matrix. Visualization for Computer Security (VizSEC '05). Oct. 26, 2005. pp. 91-98.*

Lau, Stephen. The Spinning Cube of Potential Doom. Dec. 10, 2003. http://web.archive.org/web/20040619102119/www.nersc.gov/nusers/security/TheSpinningCube.php. pp. 1-8.*

Malecot et al. Interactively Combining 2D and 3D Visualization for Network Traffic Monitoring. VizSEC '06 Proceedings of the 3rd international workshop on Visualization for computer security. Nov. 3, 2006. pp. 123-127.*

Ramadas et al. Detecting Anomalous Network Traffic with Self-organizing Maps. RAID 2003,LNCS 2820. 2003. pp. 36-54.*

Hyogon Kim, et al; "Real-time Visualization of Network Attacks on High-Speed Links", IEEE Network, Sep./Oct. 2004, pp. 2-12.

International Search Report: mailed Feb. 5, 2008; PCT/KR2007/005258, pp. 1-2.

* cited by examiner

[Fig. 1]
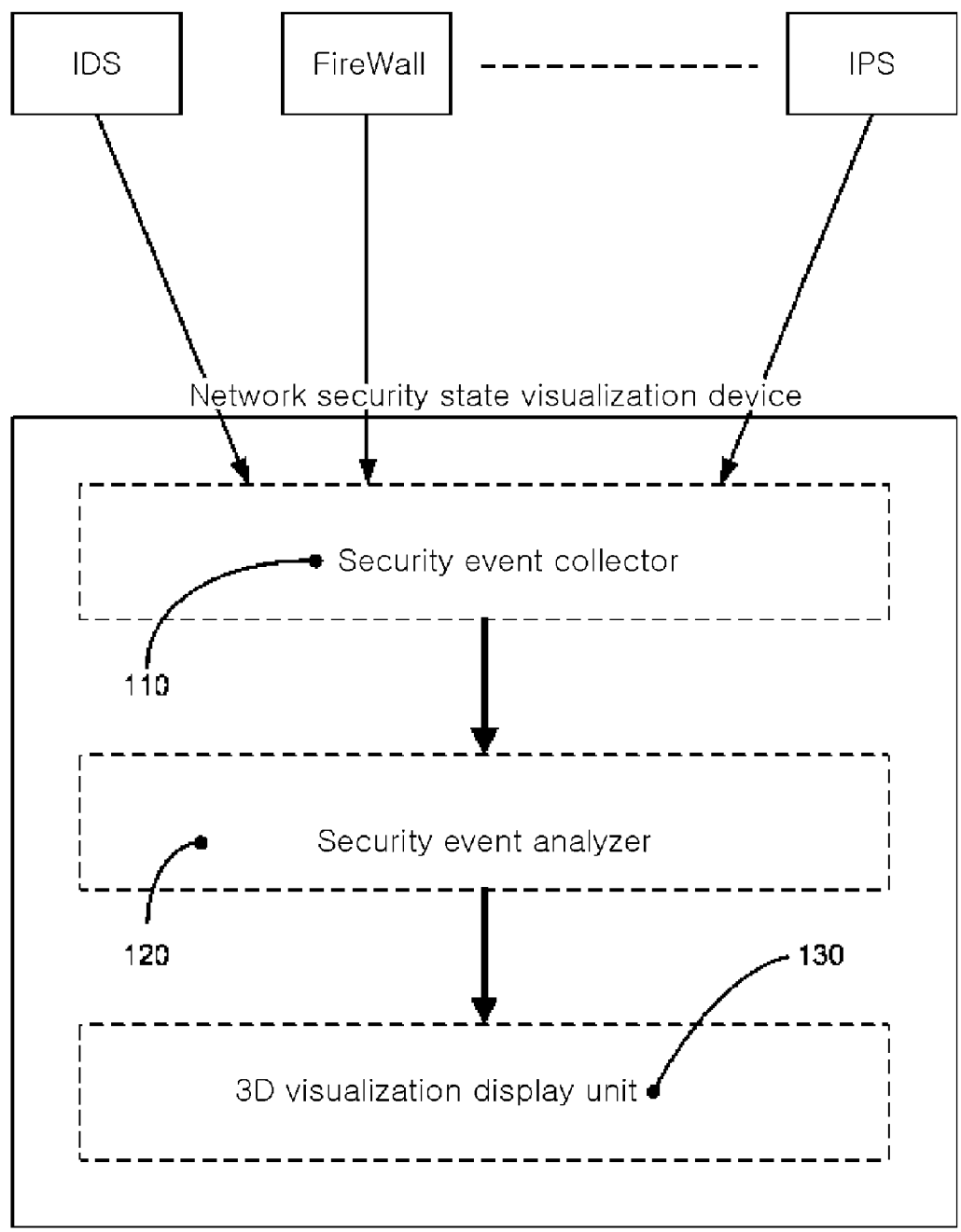

[Fig. 2]
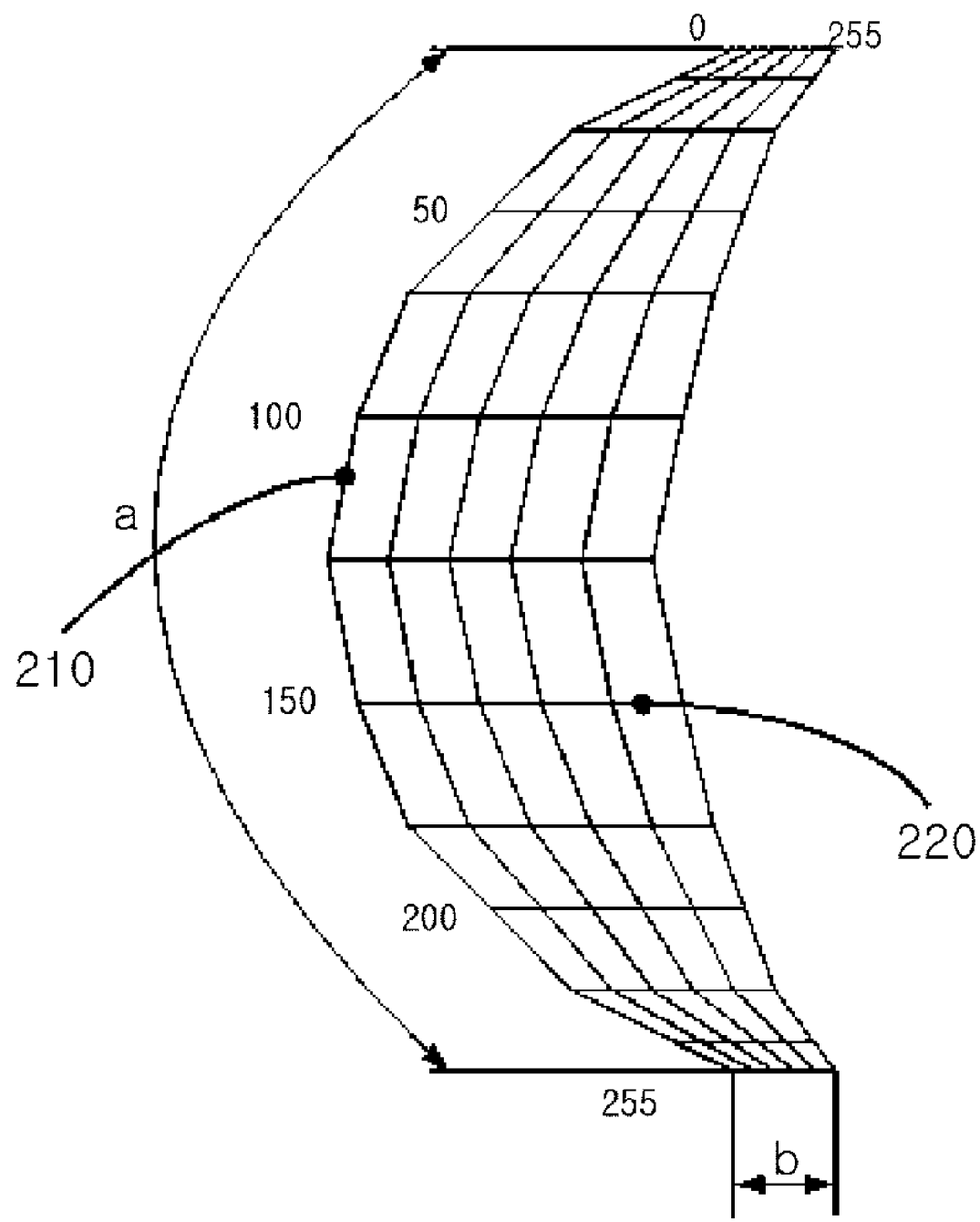

[Fig. 3]
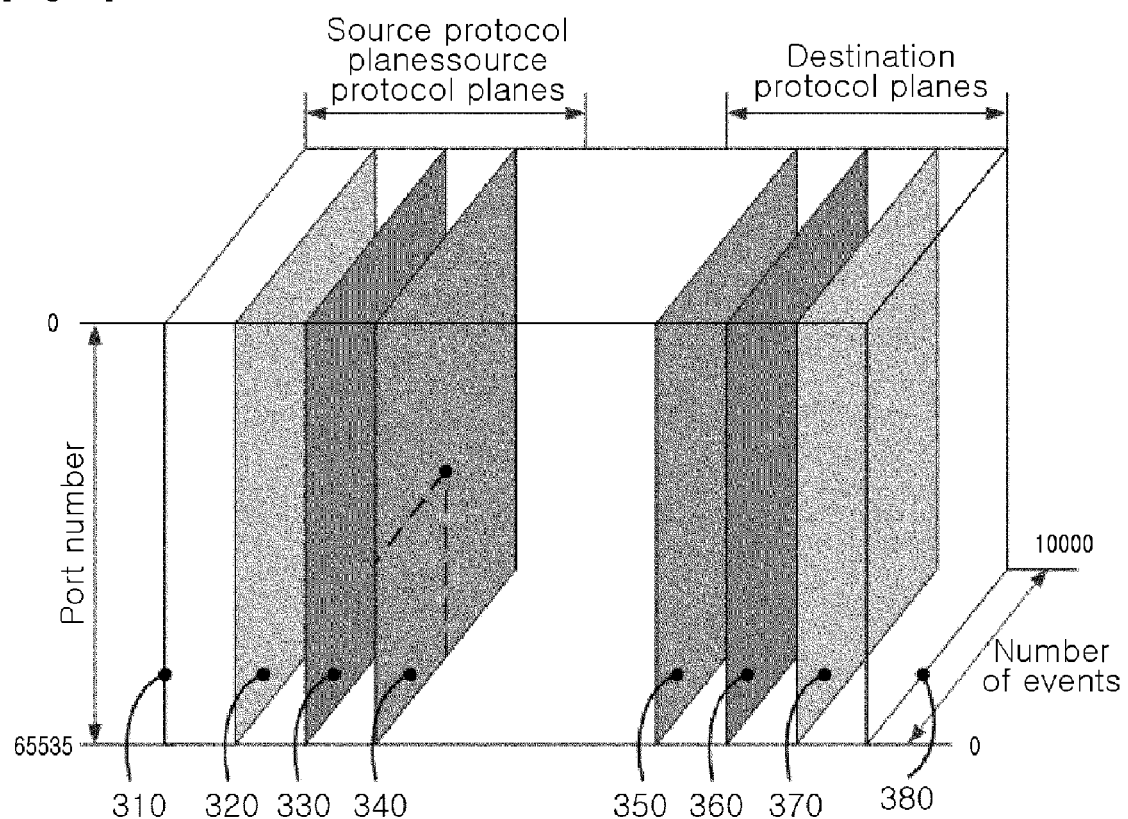

[Fig. 4]
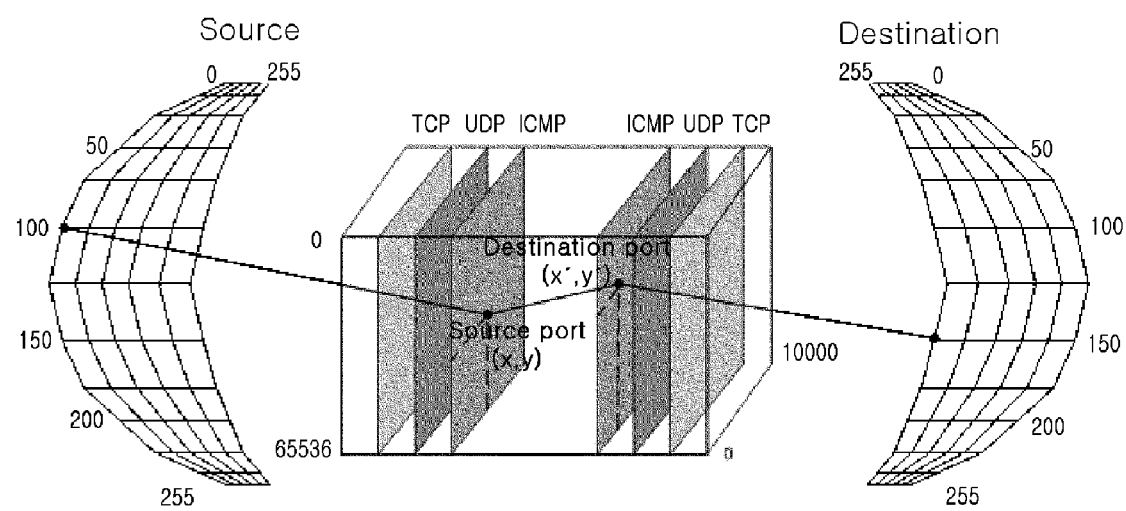

[Fig. 5]
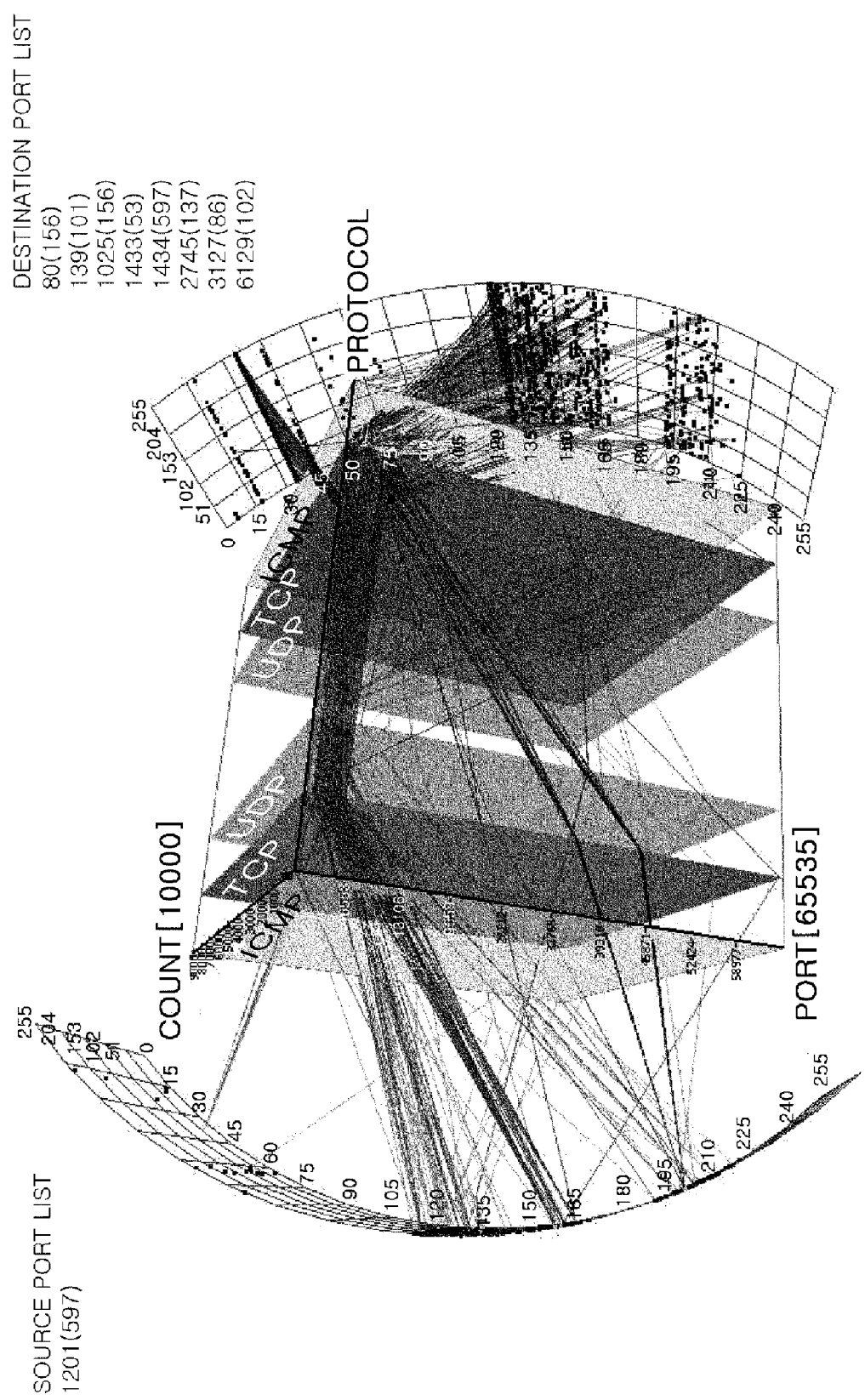

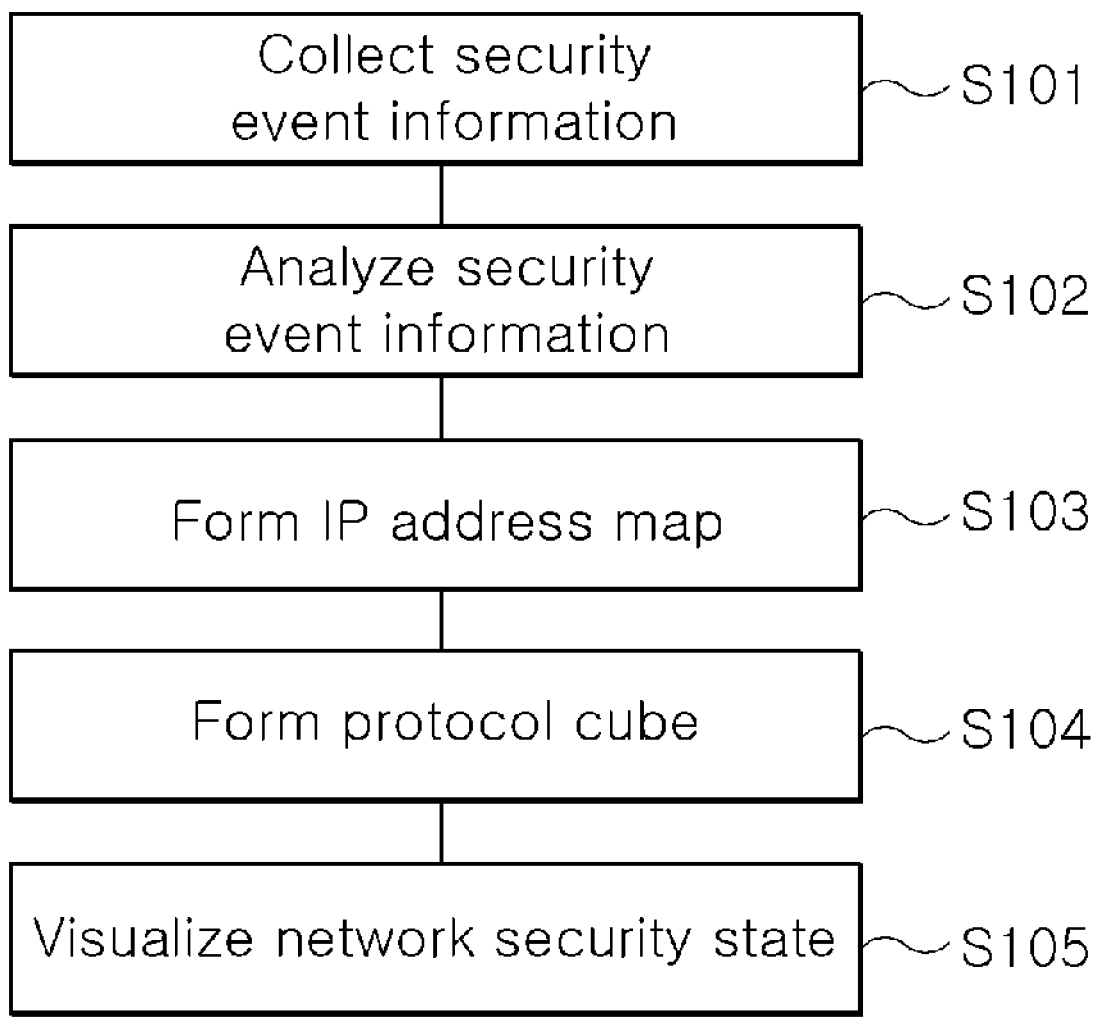
[Fig. 6]

METHOD AND APPARATUS FOR VISUALIZING NETWORK SECURITY STATE

TECHNICAL FIELD

The present invention relates to network security, and more particularly, to a network security state display device and method allowing a security state of a network to be easily determined in real time by analyzing collected security events and visualizing a security threat existing in the network.

This invention was supported by the IT R&D program of MIC/IITA. [2005-S-402-02, title: The development of the high performance network security system]

BACKGROUND ART

As a lot of computers or other computing apparatuses are mutually connected via various networks such as Internet, it becomes more and more important to protect computers from intrusions or attacks via a network or information system. As intrusions or attacks, there are computer viruses, computer worms, system component changes, service denial attacks, and additionally, misapplications of legal computer system properties.

To prevent such network attacks, academic world and security enterprises provide firewalls, intrusion detection systems (IDSs), intrusion prevention systems (IPSs), and network security methods using a technology of virtual private network (VPN).

Generally, as a method of recognizing a network security state, there are a method based on a traffic pattern occurring in a network and a method of using security events occurring from security apparatuses installed on a network. However, in the case of the method based on a traffic pattern, when the traffic pattern exceeds a certain amount based on a traffic amount, it is considered that stability of the network is affected. Accordingly, there is a restriction on analyzing an abnormal state by recognizing a correlation between generated traffic properties.

In the case of the method based on security events occurring from security apparatuses, generally, the development of a corresponding item is analyzed by displaying a ratio of one of a network address, a protocol, a port number, and the number of packets, which are characteristic information forming a security event, or a security state is visualized using a part of the characteristic information or a value obtained by contracting the characteristic information. Therefore, hitherto, since detailed contents of a present security state are not capable of being displayed in one screen and additional information is required to determined the present security state, it is difficult to an administrator to directly recognize a security event threatening the network by using the visualized security state. Accordingly, there is required a lot of time used to recognize and cope with a present abnormal state of the network in a conventional security state display apparatus, thereby increasing damages.

For this, it is required to provide a security state visualization device and method capable of allowing a present network security state to be directly recognized by effectively visualizing essential properties of a security event in one screen.

DISCLOSURE OF INVENTION

Technical Problem

An aspect of the present invention provides a network security state visualization device and method capable of allowing a present network security state to be directly recognized by effectively visualizing important characteristic information of a security event provided from a traffic, firewall, and network security apparatuses such as intrusion detection system (IDS).

An aspect of the present invention also provides a network security state visualization device and method capable of effectively visualizing correlation between characteristic information forming a security event, such as a source address, a destination address, a source port, a destination port, and protocol information.

Technical Solution

According to an aspect of the present invention, there is provided a network security state visualization device including: a security event collector collecting original security event information from network security apparatuses; a security event analyzer analyzing the original security event information collected by the security event collector and extracting characteristic data corresponding to a security event; and a three-dimensional visualization display unit visualizing a correlation between the characteristic data extracted by the security event analyzer as a three-dimensional screen to be displayed.

According to another aspect of the present invention, there is provided a method of visualizing a network security state, the method including: collecting original security event information from network security apparatuses; extracting characteristics data corresponding to a certain security event by analyzing the collected original security event information; mapping IP address information of the extracted characteristics data on an IP address map that is a matrix formed of $2^8 \times 2^8$; and mapping a source port, a destination port, and protocol information of the extracted characteristics data on a protocol cube that is a three-dimensional space formed of a plurality of protocol planes having two-dimensional information corresponding to a port number of a certain protocol and number information of events occurring at a port of the protocol.

Advantageous Effects

As described above, the network security state visualization device and method using an IP address map and protocol cube according to an exemplary embodiment of the present invention may allow a network security administrator to easily recognize a present network security state by three-dimensionally visualizing and displaying essential properties of a security event in one screen.

Also, a place where a security event occurs may be accurately shown by displaying a source and destination of the security event by using the IP address map and a plurality of protocols and ports of the respective protocols may be observed in one screen by using the protocol, thereby allowing the network security administrator to quickly recognize whether there is something wrong with the present network security state and cope therewith.

BRIEF DESCRIPTION OF THE DRAWINGS

FIG. 1 is a block diagram illustrating a network security state visualization device according to an exemplary embodiment of the present invention;

FIG. 2 is a diagram illustrating IP address map where a source IP address and a destination IP address of a security event are mapped by a three-dimensional visualization display unit according to an exemplary embodiment of the present invention;

FIG. 3 is a diagram illustrating a protocol cube where a source port, a destination port, and protocol information of a security event are mapped by the three-dimensional visualization display unit according to an exemplary embodiment of the present invention;

FIG. 4 is a diagram illustrating a method of visualizing security event information by using the IP address map and the protocol cube in the three-dimensional visualization display unit according to an exemplary embodiment of the present invention;

FIG. 5 is a diagram illustrating a visualized security event displayed on the network security state visualization device according to an exemplary embodiment of the present invention; and FIG. 6 is a flow chart illustrating a method of visualizing a network security state according to an exemplary embodiment of the present invention.

BEST MODE FOR CARRYING OUT THE INVENTION

Hereinafter, exemplary embodiments of the present invention will now be described in detail with reference to the accompanying drawings. Only, in describing operations of the exemplary embodiments in detail, when it is considered that a detailed description on related well-known functions or constitutions unnecessarily may make essential points of the present invention be unclear, the detailed description will be omitted. In the drawings, the same reference numerals are used throughout to designate the same or similar components.

FIG. 1 is a block diagram illustrating a network security state visualization device 100 according to an exemplary embodiment of the present invention.

Referring to FIG. 1, the network security state visualization device 100 includes a security event collector 110, a security event analyzer 120, and a three-dimensional visualization display unit 130.

The security event collector 110 collects original security event information from network security apparatuses. For this, the security event collector 110 real-time monitors security event logs of respective network security apparatuses such as information detection system (IDS), information prevention system (IPS), and a firewall, dispersing as shown in FIG. 1, and periodically integrates the security event logs at a regular time interval, so that collects the original security event information.

The security event analyzer 120 analyzes the original security event information collected by the security event collector 110 and extracts characteristic data corresponding to a certain security event. According to an exemplary embodiment of the present invention, the characteristic data of the security event may include one or more information of a source Internet protocol (IP) address, a destination IP address, a source port, a destination port, and protocol information of a security event.

The three-dimensional visualization display unit 130 visualizes a correlation between the characteristic data of the security event, extracted by the security event analyzer 120 as a three-dimensional screen to be outputted on a visualization device (not shown). In this case, the IP address information of the security event from the characteristic data of the security event, extracted by the security event analyzer 120, is mapped on a matrix (hereinafter, referred to as 'the IP address map') formed of $2^8 \times 2^8$. Also, the source port, destination port, and protocol information of the security event are mapped, respectively, on a three dimensional space (hereinafter, 'the protocol cube') formed of a plurality of protocol planes having two-dimensional information corresponding to a port number of a certain protocol and number information of events occurring in a port of the protocol.

FIG. 2 is a diagram illustrating an IP address map where a source IP address and a destination IP address of a security event are mapped by a three-dimensional visualization display unit according to an exemplary embodiment of the present invention. In this case, the three-dimensional visualization display unit may map the source IP address and the destination IP address on mutually different IP address maps, respectively.

Referring to FIG. 2, the IP address map includes an a-axis 210 and a b-axis 220 having a value from 0 to 255, respectively. In this case, IP address information of a certain security event is mapped on locations corresponding to a first place and a second place of the IP address on the IP address map. A source IP address of the security event may be mapped on a source IP address map, and a destination IP address of the security event may be mapped on a destination IP address map, respectively.

For example, when a source IP address of a certain security event is aaa.bbb.ccc.ddd (0=aaa, bbb, ccc, ddd=255), source IP address information is mapped on (aaa, bbb) on a source IP address map. Accordingly, when source IP addresses of mutually different security events correspond to one address from 'aaa.bbb.0.0' to 'aaa.bbb.255.255' the source IP address information of the security events is mapped on the same location on the source IP address map.

In an exemplary embodiment of the present invention, a method of mapping source IP address information with respect to a security event on a source IP map is similar to a method of mapping destination IP address information with respect to the security event on a destination IP address map.

FIG. 3 is a diagram illustrating a protocol cube where a source port, a destination port, and protocol information of a security event are mapped by the three-dimensional visualization display unit according to an exemplary embodiment of the present invention.

Referring to FIG. 3, the protocol cube includes a plurality of source protocol planes 320, 330, and 340 and a plurality of destination protocol planes 350, 360, and 370. The plurality of protocol planes 320, 330, 340, 350, 360, and 370 are paralleled on the protocol cube. The source protocol planes 320, 330, and 340 may exist distinguished from the destination protocol planes 350, 360, and 370. In this case, the protocol planes may be added or deleted depending on a requirement of a user.

In an exemplary embodiment of the present invention, the protocol plane present on the protocol cube may store information in a Y-axis 380 and a Z-axis 310. The Z-axis 310 indicates a port number of a protocol with respect to a security event, which may have a value from 0 to 65535. The Y-axis 380 indicates the number of events occurring in the port of the protocol, which may have a value from 0 to 10000. In this case, a minimum value and a maximum value of the respective axes of a certain protocol plane may be varied with a set by a user. According to the set, only one certain port or only one certain protocol may be displayed.

FIG. 4 is a diagram illustrating a method of visualizing security event information by using the IP address map and the protocol cube in the three-dimensional visualization display unit 130 according to an exemplary embodiment of the present invention.

It is assumed that a security event extracted by the security event analyzer 120 to be visualized by the three-dimensional visualization display unit 130 is an Internet control message protocol (ICMP) sent from an x port of 100.0.0.1 to an x port of 150.255.255.255, y number of security events using the x port occur, and y number of security events using the x port occur.

Source IP address information 100.0.0.1 of the security event is mapped on (100, 0) of a source IP address map, and destination IP address information 150.255.255.255 of the security event is mapped on (150, 255) of a destination IP address map.

Also, x, a port number that is source port information of the security event, y, the number of times that the security event occurs in the x port, and ICMP, protocol information of the security event, are mapped on (x, y) of a source ICMP plane. x, a port number that is destination port information of the security event, y, the number of times that the security event occurs in the x port, and ICMP, protocol information, of the security event are mapped on (x, y) of a destination ICMP plane.

On the other hand, when a certain security event is visualized by the three-dimensional visualization display unit 130 as shown in FIG. 4, it may be known that the security event using an ICMP sent from an x port of a source IP address 100.0.ccc.ddd (0≦ccc, ddd≦255) to an x port of a destination IP address 150.255.ccc.ddd (0≦ccc, ddd≦255) occurs in which the security event using the x port presently occurs y times and the security events using x' port presently occurs y' times.

FIG. 5 is a diagram illustrating a visualized security event displayed on the network security state visualization device according to an exemplary embodiment of the present invention.

Referring to FIG. 5, security events provided from network security apparatuses are displayed by connecting a source IP address map, a destination IP map, and protocol information thereof using a distinguishable color, respectively. In an exemplary embodiment of the present invention, the security events may be visualized in such a way that respective protocol planes forming the protocol cube to have a distinguishable color. Also, the security event may be visualized in which a certain color is given to a security event presently given a great deal of weight to easily distinguish a portion where there is something wrong with a security state. In addition, the security event may be visualized in such a way that information given a great deal of weight on a present security state is displayed in the form of a text.

FIG. 6 is a flow chart illustrating a method of visualizing a network security state according to an exemplary embodiment of the present invention.

Referring to FIG. 6, original security event information is collected from network security apparatuses (S101). For this, security event logs of the respective network security apparatuses may be monitored in real time, and the original security event information may be periodically integrated and collected at a regular time interval.

Characteristic data with respect to a certain security event are extracted by analyzing the collected original security event information (S102). In an exemplary embodiment of the present invention, the characteristic data with respect to the security event may include one or more information of a source IP address, a destination IP address, a source port, a destination port, and protocol information of the security event.

The extracted IP address information of the security event is mapped on an IP address map, which is a matrix formed of $2^8 \times 2^8$ (S103). In an exemplary embodiment of the present invention, the source IP address and the destination IP address may be mapped on mutually different IP address maps. In this case, the IP address information may be mapped on two-dimensional coordinates of the IP address map, which correspond to values of a first place and a second place of the IP address.

The extracted source port, destination port, and protocol information of the security event are mapped on a protocol cube, which is a three-dimensional space formed of a plurality of protocol planes having two-dimensional information corresponding to a port number of a certain protocol and the number of events occurring in a port of the protocol (S104).

When the IP address map and protocol cube with respect to the security event are completed by S103 and S104, a network security state is visualized (S105). The operation of visualizing the network security state is performed by connecting points on the IP address map and protocol cube with respect to the security event to display on a three-dimensional screen. In this case, the points may be connected by using a distinguishable color to be displayed on the three-dimensional screen. Also, the respective protocol planes forming the protocol cube may be displayed to have a distinguishable color, a certain color is given to a security event presently given a great deal of weight to easily distinguish a portion where there is something wrong with a security state, and information of ports given a great deal of weight on a present security event may be displayed in the form of a text.

While the present invention has been shown and described in connection with the exemplary embodiments, it will be apparent to those skilled in the art that modifications and variations can be made without departing from the spirit and scope of the invention as defined by the appended claims.

The invention claimed is:

1. A network security state visualization device comprising:
   a processor;
   a security event collector collecting original security event information from network security apparatuses;
   a security event analyzer analyzing the original security event information collected by the security event collector to extract characteristic data corresponding to a security event;
   a three-dimensional visualization display unit visualizing a correlation between the security event characteristic data extracted by the security event analyzer as a three-dimensional screen to be displayed; and
   wherein the three-dimensional visualization display unit maps the source port, the destination port, and the protocol information of the security event on a protocol cube, which is a three-dimensional space comprising a plurality of protocol planes having a first axis designating information corresponding to a port number of a certain protocol and a second axis designating a number of events occurring at a port corresponding to the protocol and wherein the protocol cube is spatially located between the source IP address map and the destination IP address map.

2. The device of claim 1, wherein the network security apparatus is at least one of IDS (intrusion detection system), IPS (intrusion prevention system), and a firewall.

3. The device of claim 1, wherein the security event collector real-time monitors a security event log of the network security apparatus and periodically integrates the security event log at every regular time interval, so that it collects the security event information.

4. The device of claim 1, wherein the characteristic data of the security event, extracted by the security event analyzer, comprises at least one of a source IP address, a destination IP address, a source port, a destination port, and protocol information of the security event.

5. The device of claim 4, wherein the three-dimensional visualization display unit maps IP address information of the security event, from the characteristic data, on an IP address map, which is a matrix of $2^8 \times 2^8$.

6. The device of claim 5, wherein the IP address map comprises an a-axis and a b-axis having a value from 0 to 255, respectively.

7. The device of claim 5, wherein the IP address information of the security event is mapped in locations corresponding to a first place and a second place of the IP address on the IP address map.

8. The device of claim 5, wherein the source IP address of the security event is mapped in a source IP address map and the destination IP address is mapped in a destination IP address map, respectively.

9. The device of claim 1, wherein the protocol cube comprises a plurality of source protocol planes and a plurality of destination protocol planes.

10. A method of visualizing a network security state, the method comprising:
    collecting original security event information from network security apparatuses; extracting characteristics data corresponding to a certain security event by analyzing the collected original security event information;
    mapping IP address information of the extracted characteristics data on an IP address map that is a matrix formed of $2^8 \times 2^8$; and
    mapping a source port, a destination port, and protocol information of the extracted characteristics data on a protocol cube that is a three-dimensional space formed of a plurality of protocol planes having a first axis designating information corresponding to a port number of a certain protocol and a second axis designating a number of events occurring at a port of the protocol, and wherein the protocol cube is spatially located between the source IP address map and the destination IP address map.

11. The method of claim 10, further comprising visualizing a network security state in which points on the IP address map and the protocol cube with respect to the security event are connected respectively and displayed on a three-dimensional screen.

12. The method of claim 11, wherein a different color is given depending on a weight of the security event when connecting the points on the IP address map and the protocol cube with respect to the security event.

13. The method of claim 11, wherein, in the visualizing, the respective protocol planes forming the protocol cube are displayed to have a distinguishable color.

14. The method of claim 10, wherein the collecting original security event information is performed by a process of real-time monitoring a security event log of the network security apparatuses and periodically integrating the security event log at a regular time interval.

15. The method of claim 10, wherein the characteristic data of the extracted security event comprises at least one of a source IP address, a destination IP address, a source port, destination port, and protocol information.

16. The method of claim 15, wherein the mapping IP address information of the extracted characteristics data is performed by a process of mapping the source IP address and the destination IP address on mutually different IP address maps, respectively.

17. The method of claim 10, wherein the mapping IP address information of the extracted characteristics data is performed by a process of mapping on two-dimensional coordinates of the IP address map, the coordinates corresponding to a first and second place values of the IP address.

18. A method of visualizing a network security state, the method comprising:
    collecting original security event information from network security apparatuses;
    extracting characteristics data corresponding to a certain security event by analyzing the collected original security event information;
    mapping IP address information of the extracted characteristics data on a source IP address map that is a matrix formed of $2^8 \times 2^8$ and a destination IP address map that is a matrix formed of $2^8 \times 2^8$;
    mapping a source port, a destination port, and protocol information of the extracted characteristics data on a protocol cube that is a three-dimensional space formed of a plurality of two-dimensional protocol planes having a first axis designating information corresponding to a port number of a certain protocol and a second axis designating a number of events occurring at a port of the protocol;
    wherein the protocol cube is spatially located between the source IP address map and the destination IP address map.

19. The method according claim 18, wherein mapped information points on the source IP address map, protocol planes, and destination IP address map are visually connected by a line to display a security event.

* * * * *